Sept. 24, 1946.　　C. C. CALABRESE ET AL　　2,408,043
FIRE HOSE REEL
Filed May 15, 1944　　2 Sheets-Sheet 1
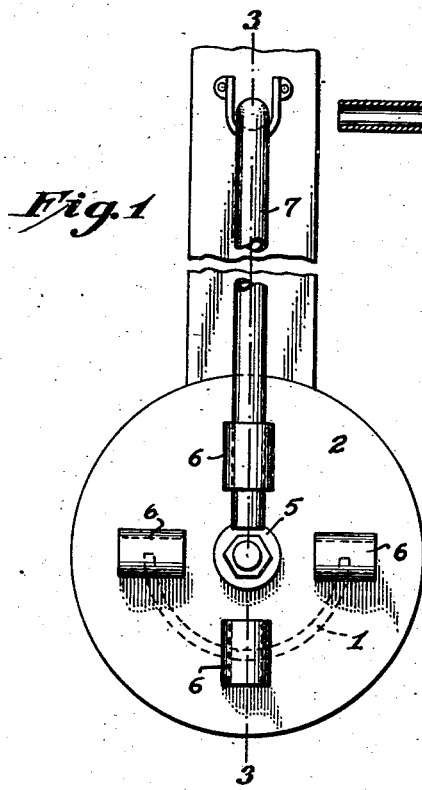
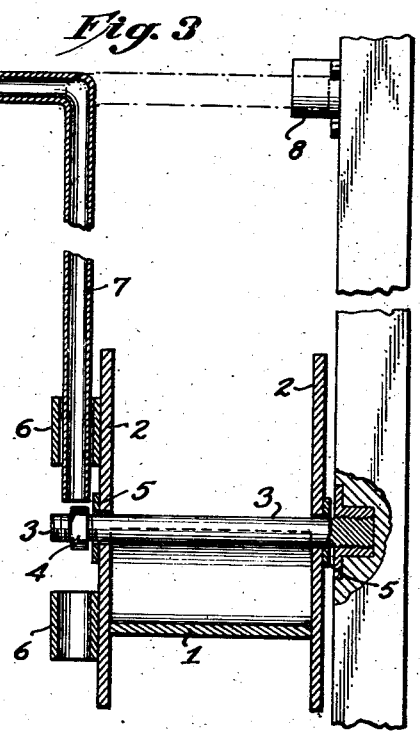
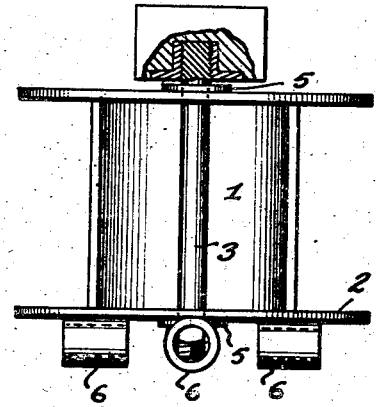
Inventors
CONLONEL CHARLES CALABRESE
JOHN SUBLETT HEROLD
By M. O. Hayes
Attorney Sept. 24, 1946. C. C. CALABRESE ET AL 2,408,043
FIRE HOSE REEL
Filed May 15, 1944 2 Sheets-Sheet 2

Inventors
COHLONEL CHARLES CALABRESE
JOHN SUBLETT HEROLD

By M. O. Hayes

Attorney

Patented Sept. 24, 1946

2,408,043

UNITED STATES PATENT OFFICE 2,408,043

FIRE HOSE REEL

Conlonel Charles Calabrese, Webster Groves, Mo., and John Sublett Herold, Greenwich, Conn.

Application May 15, 1944, Serial No. 535,628

1 Claim. (Cl. 242—86)

(Granted under the act of March 3, 1883, as amended April 30, 1928; 370 O. G. 757)

The invention relates to an improved type of hose reel for the stowage of fire hose at or near a fire plug. The objects of the improvement are to provide in a single size and style of hose reel facilities whereby, first, various lengths of either 1½ inch or 2½ inch standard fire hose may be compactly stowed in a manner which is commonly called a "doughnut roll"; second, the hose may be so stowed that one end of it may remain attached to a fire plug; third, the hose reel with the hose rolled thereon may be locked against rotation; fourth, the hose may without the use of bulky drum flanges be retained on the reel and; fifth, the hose may be rolled and retained on the core of the reel drum without slipping and from which, when unrolling, the end of the hose roll will automatically drop free of the core.

Figure 5:
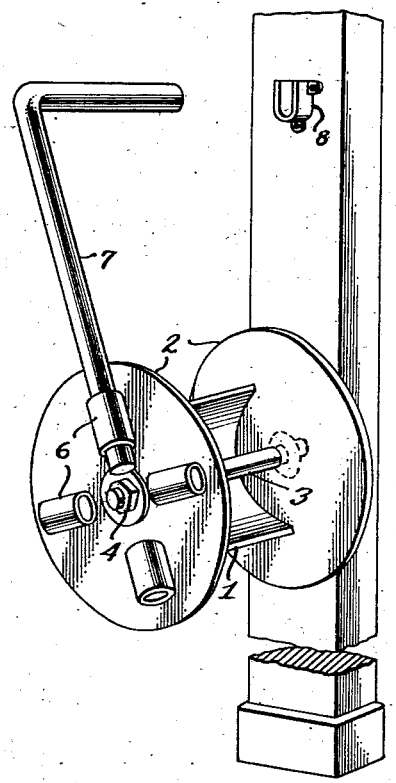
Figure 6:
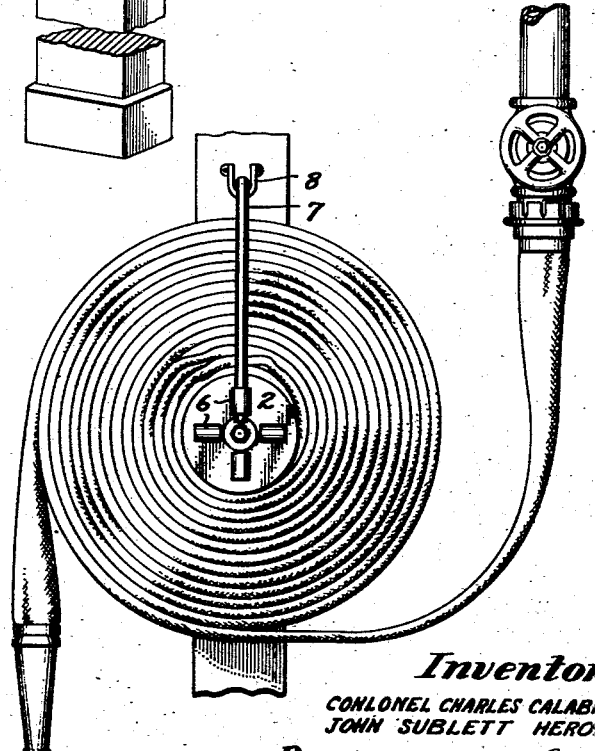

The invention is illustrated by the two drawings attached hereto. Figure 1 is an end view of the hose reel; Figure 2 is a plan view of the hose reel with the crank removed; Figure 3 is a vertical section of the hose reel on the line 3—3 of Figure 1; and Figure 4 shows the details of the crank handle retaining bracket. Figure 5 is a view in perspective of the hose reel, and Figure 6 illustrates the use of the hose reel with 100 feet of 2½ inch fire hose rolled thereon.

The hose reel resembles a small windlass, consisting of three main parts, as follows: the drum, the shaft assembly, and the crank assembly.

The drum consists of a semi-cylindrical steel core 1 to each end of which a metal flange 2, with a hole through its center, is attached. As hereinafter described, the semi-cylindrical shape of the core 1 provides a surface around which the fire hose, when being rolled on the drum, will not slip.

A shaft 3, one end of which is attached to a wall (adjacent to a fire plug), provides the horizontal support on which the drum rotates. A machine nut 4, screwed on the threaded end of the shaft 3, retains the drum in place. Two washers 5, 5 are employed, as indicated in Figures 2 and 3, to insure free rotation of the drum. These parts constitute the shaft assembly.

The crank assembly consists of four cylindrical crank sockets 6, 6, 6, 6, a crank 7, and a crank handle retaining bracket 8. The four sockets 6, 6, 6, 6, equally spaced from each other and from the drum's axis of rotation (see Figure 1), are welded to the outside flange 2 of the drum. The removable crank 7, the arm end of which can be inserted into any one of the four sockets 6, 6, 6, 6, provides the means for turning the drum so fire hose may be rolled upon it. The crank 7 (in addition to its rotation about the axis of the drum) is free to rotate in the crank socket 6, and may, when the hose is fully wound on the drum, be rotated 180 degrees. This permits the handle of the crank 7 to be dropped into the retaining bracket 8, which is mounted on the wall above the drum. In this position the crank handle serves a function similar to a pawl on a windlass. It locks the drum, preventing its rotation. The crank arm, lying against the outside edge of the rolled hose, fulfills the function of a large flange by preventing the hose from slipping off the side of the drum.

The installation of the hose reel is accomplished as follows: at the desired hose location the shaft 3 is attached to a vertical surface (wall or bulkhead). The drum and washers 5, 5 are then slipped on the shaft 3 and retained thereon by the shaft nut 4. Directly above the drum, and at the proper distance from it, the crank handle retaining bracket 8 is attached to the vertical surface. This completes the installation of the hose reel.

To prevent misplacing the removable crank 7 it may be inserted in one of the crank sockets 6, rotated, and dropped into the crank handle retaining bracket 8, where it is securely held in place.

The stowage of fire hose on the reel is accomplished as follows: The female end of the fire hose is attached to the fire plug, a nozzle to the male end. The hose is stretched out on the floor and then the nozzle end folded back towards the female end so the hose is doubled, or one half of the hose overlaps the other half. Grasping the folded end, or center section of the hose, it is placed over the drum's core 1, held firmly against it, and the drum rotated with the crank 7. The shape of the drum core (being non-symmetrical) is such that the folded end of the hose is bent or slightly kinked against one edge of the core. This prevents the hose from slipping over the core as the drum is rotated. Once the roll is started the hose may be rapidly wound on the drum. A free hand is used to guide the hose so a neat roll is obtained. Rotation of the drum is prevented when all the slack in that part of the hose between the fire plug and reel has been rolled on the drum. If at this stage, the male (nozzle) end of the hose is not completely rolled on the drum, it may be folded back and forth (faked) across the top of the rolled hose, or left hanging from the reel. This completes rolling the hose.

In order to lock the drum and the hose thereon, the drum is slightly rotated in either direction so one of the four crank sockets is brought into vertical alignment with the crank handle retaining bracket 8. If this socket does not correspond to the one in which the crank is already inserted, remove the crank and place it in the proper socket. Then rotate the crank handle inward over the rolled hose and drop it into the crank handle retaining bracket 8. As previously stated, this locks both the drum and the crank, and retains the hose roll on the drum. This completes stowing the hose.

Figure 6 illustrates the use of the hose reel with 100 feet of 2½ inch hose stowed thereon.

Removing the hose to fight a fire is simple and rapid. The crank is pulled upward clear of both its socket and the retaining bracket. This releases the drum, whereupon the hose can be run freely from it.

The hose reel may be employed for the stowage of standard linen or cotton rubber-lined fire hose of either 1½ inches or 2½ inches diameter. Employing 2½ inch hose the reel will accommodate in a single roll either one or two 50 foot hose lengths. When 1½ inch hose is employed the reel will accommodate two, side by side, rolls, each consisting of either 50 or 100 feet.

The invention described herein may be manufactured and used by or for the Government of the United States of America for governmental purposes without the payment of any royalties thereon or therefor.

We are aware that prior to our invention fire hose reels, with cranks for turning them, have been made. We therefore do not claim such a device or combination broadly: but,

We claim:

A reel comprising a spindle fixed in a horizontal position to a vertical support, a hub journalled on said spindle, said hub consisting of a pair of spaced plates joined by a transversely extending concavo-convex member, concentric with the spindle, a socket fixed to one of said plates and radially with respect to the axis of the spindle, a handle detachably inserted in said socket to effect rotation of the hub about its spindle, said handle having a lateral extension adapted when the handle is rotated about its longitudinal axis to extend transversely of the reel, means associated with the reel and fastened to said support for engaging the terminal end of the handle when positioned transversely of the reel, said terminal end of said handle being disposed in engagement with said last named means by lifting it radially with respect to the spindle and being maintained in engagement with said last named means by gravity, whereupon rotation of the reel will be prevented.

CONLONEL CHARLES CALABRESE.
JOHN SUBLETT HEROLD.